Nov. 19, 1968  L. R. KEYSER  3,411,545
REINFORCED CONCRETE PIPE
Filed Aug. 18, 1966
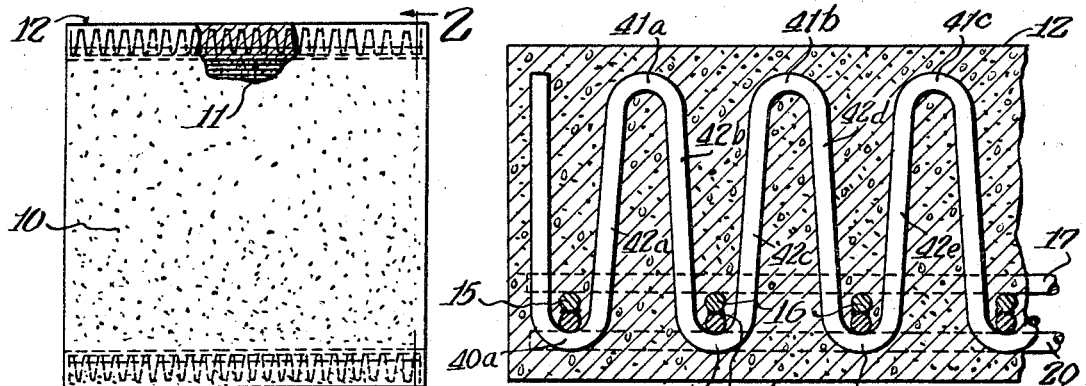
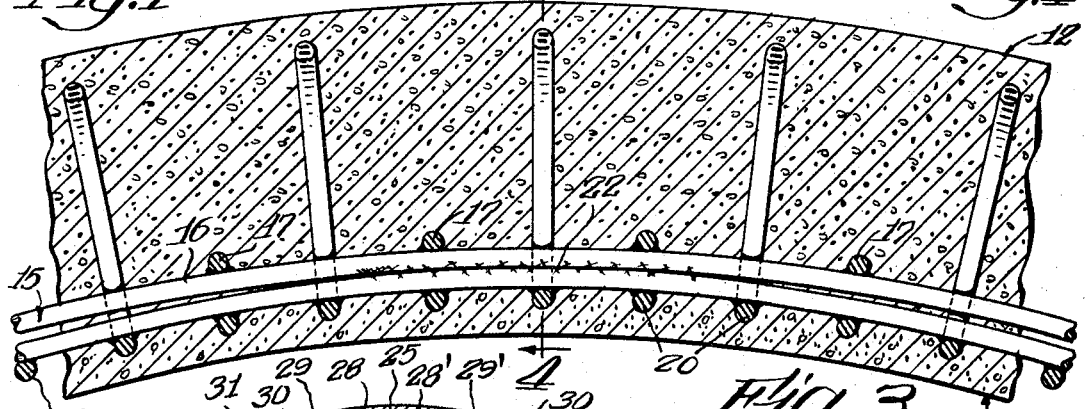
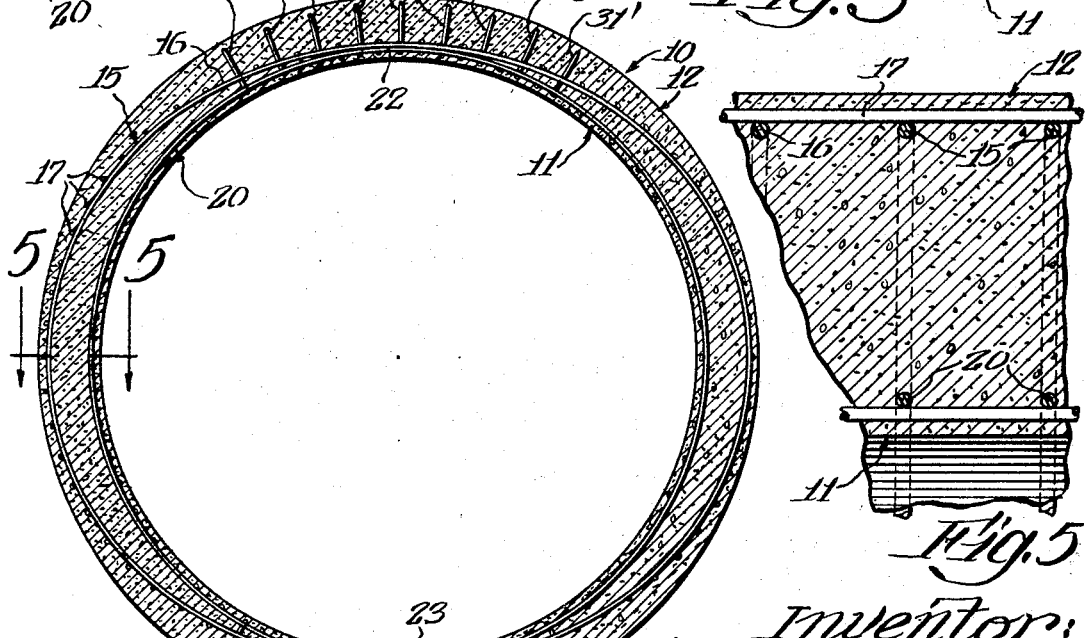
Inventor:
Lewis R. Keyser
BY Robert L. Kahn Atty

United States Patent Office 3,411,545
Patented Nov. 19, 1968

3,411,545
REINFORCED CONCRETE PIPE
Lewis R. Keyser, Dayton, Ohio, assignor to Price Brothers Company, Dayton, Ohio, a corporation of Michigan
Filed Aug. 18, 1966, Ser. No. 573,272
3 Claims. (Cl. 138—175)

ABSTRACT OF THE DISCLOSURE

Large diameter concrete pipe has a cylindrical steel reinforcing cage extending the length of the pipe disposed within the concrete wall adjacent the inner pipe surface. An elliptical steel reinforcing cage extending along the length of the pipe is disposed entirely within the concrete. At the crown and invert pipe regions, the elliptical cage is secured to the circular cage. At the region of spring line, the elliptical cage is adjacent the outer surface of the pipe. Additional steel reinforcement in the form of stirrups extend radially from the circular cage along the length of the pipe. Such additional stirrups are disposed at the crown and invert regions of the pipe, symmetrically with respect to the vertical plane in the installed position of the pipe. The additional reinforcing stirrups for a reinforced region subtend a total angle of about 60° to 70° at the crown and invert regions of the pipe.

---

This invention relates to reinforced concrete pipe and, more particularly, to large diameter concrete pipe ranging up in size from about 4 feet in diameter and particularly in the range of pipes having diameters from 9 feet to about 12 feet. The pipe embodying the present invention has steel reinforcement for the purpose of resisting external loading and is not adapted for handling fluids under pressure. Such prestressed pipe is designated as pressure pipe and has pre-stressed steel reinforcement. The pipe embodying the present invention is free from prestressing and is generally used for sewers and culverts.

The pipe embodying the present invention is a modification of the pipe disclosed and claimed in my co-pending application S.N. 561,272, filed June 28, 1966. The pipe to which the present invention relates is of the type having an elliptical steel cage within the pipe wall for reinforcement purposes. A pipe having such a reinforcement must be properly oriented when laid in its bed. Such a pipe has the elliptical cage so disposed that the minor axis of the cage is vertical and the major axis of the cage is horizontal. As a rule, such cage is normally disposed about 1 inch or 1½ inches from the inner pipe surface at the minor axis and about 1 inch or 1½ inches from the outer surface at the major axis of the cage ellipse. The pipe to which the invention is applicable will have a wall thickness between inner and outer pipe surfaces of at least about 5 inches although in some cases, the invention may be applied beneficially to a thinner wall when loading is abnormally high.

As is well known, when a concrete pipe is installed and under load, there is a tendency for the pipe to distort and assume an elliptical shape, the minor axis being vertical and passing through the crown and invert and the major axis being horizontal and being the spring line of the pipe. When a pipe has steel reinforcement in the form of a cage, whether elliptical or circular, the tendency for the pipe to distort results in the creation of powerful forces tending to straighten the normally curved steel reinforcement at the crown and invert. This straightening tendency creates tensioning stresses in the concrete wall at the crown and invert at the inner wall portions. Tension forces in the concrete at the crown and invert regions create powerful forces for throwing off the concrete from the inner forces of the pipe wall. The loads that produce stresses in the cage circumferential reinforcement also produce shear stresses at the crown and invert wall portions, such stresses tending to cause diagonal cracking of the pipe wall.

In accordance with the present invention, I have provided supplementary reinforcing means for a cylindrical concrete pipe having an elliptical cage steel reinforcement. The objective of the supplementary reinforcement is to resist the forces that create diagonal cracking in the pipe wall from the shear loads and the radial tension of the circumferential steel reinforcement at the crown and invert portions of the pipe. The supplementary reinforcement in a pipe embodying the present invention provides for an inner cage which is cylindrical and adjacent the inner surface of the pipe and also includes stirrups at the crown and invert regions for imparting reinforcement in depth to a substantial portion of the concrete wall in these two regions.

The invention will now be described in connection with the drawing wherein FIG. 1 is a length of pipe embodying the present invention, with parts broken away.

FIG. 2 is a transverse section on line 2—2 of FIG. 1.

FIG. 3 is an enlarged detail of a portion of the crown reinforcement.

FIG. 4 is a section on line 4—4 of FIG. 3.

FIG. 5 is a sectional detail on line 5—5 of FIG. 2.

Concrete pipe 10 has inner cylindrical wall surface 11 and outer cylindrical wall surface 12. The diameter of a pipe may be within the range specified, the advantages accruing to a structure embodying the invention increasing in value with the diameter of pipe. Disposed within the concrete is elliptical cage 15 of steel wire or rod. Cage 15 has coils 16 and longitudinal tie rods 17 for maintaining the coils in position. Coils 16 may either be separate elliptical coils spaced apart from each other or may be a continuous length of steel wire or rod to provide a helix having an elliptical shape. Inasmuch as such elliptical cages are old, no detailed description is necessary. As is well understood, the steel making up the cage has the various parts spot welded to form a unitary structure, and the cage as such is bonded to the concrete during the casting of the pipe.

Cage 15 is spaced from inner pipe wall 11 at the crown and invert at least 1 inch and possibly a bit more than 1 inch to accommodate the additional steel cage to be described. Cage 15 also comes within about 1 inch or 1½ inches from the outer surface 12 of the pipe at the spring line.

Disposed within the concrete is auxiliary cage 20 which is generally cylindrical and is disposed within the concrete at about 1 inch or 1½ inches from inside pipe wall 11. The construction of cage 20 can follow the same general pattern as cage 15. The coils in the two cages register, particularly at the crown and invert regions so a radial metal strip can pass straight through coincident spaces. The spacing of the tie rods and the gauge of metal used in cages 15 and 20 will depend upon the stress requirements of a pipe and this, in turn, will involve pipe diameter, wall thickness, loading conditions and the like. At the crown and invert portions of the two cages, there will be regions 22 and 23 where the metal of the two cages, particularly the coil portions, will be in contact with each other and where such contacting coil portions can be welded at various spots. In order to permit the coil portions of inner circular cage 20 and elliptical cage 15 to be in contact at the crown and invert, it is preferred to have the tie rods of cage 15 on the outside of the coils and the tie rods of cage 20 on the inside. However, except at regions 22 and 23 where the two cage coils are in contact, it makes no difference whether the tie rods of either cage are on the inside or the outside. For the sake of uniformity, the arrangement of tie rods on the inside of cage 20 and the outside of cage 15 is convenient.

Auxiliary cage 20 carries a plurality of outwardly extending stirrups for reinforcing the crown and invert regions of the pipe wall. The angular extent of the stirrup reinforcement is about 60 degrees or 70 degrees at each region, the angle being measured from the center of a pipe (this being the intersection of the spring line and vertical axis). The angularly disposed reinforcing region is symmetrically disposed with reference ot the vertical axis so that the extent of the stirrup reinforcement runs about 30 degrees to 35 degrees from each side of the vertical axis.

As illustrated here, centrally disposed stirrups 25 and 26 extend radially outwardly substantially at the vertical axis of the pipe, these stirrups extending respectively from the top and bottom portions of the cage structure. It is not necessary that central stirrups 25 and 26 be located exactly along the vertical axis and the departure of a few degrees is permissible. Symmetrically disposed with reference to stirrup 25 are stirrups 28 to 31 inclusive forming one group of spaced stirrups on one side of stirrup 25 and stirrups 28' and 31' forming another group on the other side of stirrup 25. The number and spacing of the stirrups making up the crown region reinforcement will depend upon a stress analysis of the pipe and can be varied to suit specifications and conditions. An angular spacing between adjacent stirrups in each group need not necessarily be uniform. Thus, for example, stirrups 28 and 29 (as well as 28' and 29') may be spaced a little closer to stirrup 25 for resisting the peak stresses in the concrete wall.

Similarly on each side of bottom stirrup 26 are groups of stirrups 33 to 36 inclusive on one side and 33' to 63' inclusive on the other side. While in theory the stress in the concrete wall at the invert is somewhat greater than at the crown, due to the weight of the pipe, apart from loading on the pipe, in practice the number and spacing of the stirrups can be the same at the top and bottom based upon maximum calculated stresses for the invert wall portion.

All stirrups have similar construction and will now be described in connection with FIGS. 1 and 4. Stirrup 25, as an example, consists of a sinuous continuous length of steel rod having inner bight portions 40a, 40b, etc. and outer bight portions 41a, 41b, etc. between which are generally straight connecting portions 42a, 42b, etc. Inner bight portions 40, 40a, etc. enfold the inside coil portions of inner cage 20 (this being the portion of the steel reinforcement which is closest to inner wall 11 of the pipe) and is welded thereto at desired intervals. A stirrup has a bight portion enfolding every coil of auxiliary cage 20. However, it is not necessary that every inner bight be welded to every coil since in practice welding every 12 inches or so will generally suffice.

The objective of the welding procedure as far as stirrups are concerned is simply to maintain the stirrups radially in the position illustrated in FIG. 2 until after casting. Once the concrete has set, the fact that the bights enfold the cage coils will be sufficient since the inner bights will be tensioned under pipe load. It is important that the stirrups be so disposed that the inner bights enfold the cage coils as illustrated and not be disposed along the outside of the coils even if welded thereto. In the latter case, the failure of a weld will render a stirrup valueless.

Each stirrup extends straight along the length of a pipe and the outer bight portions and straight connecting portions 42a, 42b, etc. extend radially away from cage 20. The extent of straight portions 42a, 42b, etc. is such that outer bights 41a, 41b, etc. go up to within about 1 inch of outer pipe surface 12. It has been found that such stirrup reinforcement extending for most of the wall thickness provides a high degree of reinforcement against any diagonal tension or radial tension cracks which would normally originate at the crown and invert parts of inner surface 11 and extend generally outwardly.

Any cracks in the concrete pipe wall at the crown or invert regions will normally start from the inner pipe surface and extend outwardly for a short distance in a generally radial direction and then begin to curve over toward the vertical axis. Thus, stirrups disposed in accordance with the invention will intersect any cracks which may form and begin to curve toward the vertical axis extending between the crown and invert. It is understood, of course, that the vertical axis is part of a vertical plane extending for the length of a pipe and that the continuous stirrups extending for the length of a pipe function to stop the development of cracks.

The outer bight portions of each stirrup pass through the registering spaces between coils of the elliptical and cylindrical cages. It is thus necessary to so position the two cages that at least at the crown and invert regions where stirrups are provided, the coils and spaces between coils in the two cages generally register.

It has been found that the anchorage of the outwardly extending stirrups in the outer portions of the concrete wall at both the crown and invert regions (where the concrete is in compression) is sufficiently good so that the stirrup inner bight portions support the steel of the cages at the crown and invert regions against inward movement toward the pipe axis which tendency generally results in putting the concrete in tension. The amount of steel necessary for cages and stirrups can be determined by general engineering analysis of the pipe under specified loads. It is essential that the outer bights of the stirrups extend to about an inch of the outer pipe surface. This, together with the interlocking of cage coils and stirrup inner bights, provides excellent reinforcement.

What is claimed is:

1. A concrete pipe construction for use in sewers and culverts wherein said pipe has a diameter of at least about 4 feet and a wall thickness of at least about 5 inches, said construction having an outer steel reinforcing cage including longitudinal rods and generally elliptical coils spaced along the length of the pipe, an inner cage having longitudinal rods and generally circular coils spaced along the length of the pipe, said inner cage having such a diameter that said inner cage and outer cage are substantially tangent along the plane extending for the length of the pipe and bi-secting the same and being generally vertical when the pipe is laid, the elliptical cage major axis being in a generally horizontal plane defining spring lines, said two cages having registering intercoil spaces, and additional steel reinforcement at the crown and invert pipe regions, said additional steel reinforcement subtending an angle of about 60 degrees to 70 degrees at each of the aforementioned regions, said additional reinforcement consisting of steel stirrups having a sinuous shape but extending longitudinally of the pipe, each sinuous stirrup having an inner bight portion which enfolds at least each coil of the inner cage and wherein the outer bight portion extends radially with respect to the pipe axis from the inner bight portion, all the steel being wholly within the concrete wall and bonded thereto, said inner bight portions being spaced from the inner pipe wall about an inch and said stirrups extending toward the outer pipe wall to within about an inch thereof, said stirrups providing reinforcement at the crown and invert regions by virtue of the outer portions of the stirrups being anchored in pipe wall portions which are normally under compression when the pipe is in use.

2. The construction according to claim 1 wherein the rods on the elliptical cage, at least at the regions where stirrup reinforcement is provided, are on the outside of the coils and wherein the rods on the inner cage are on the inside of the coils whereby the coils themselves can be in contact at the crown and invert.

3. The construction according to claim 1 wherein said stirrups are welded at their inner bights to less than all inner cage coils.

References Cited

UNITED STATES PATENTS

| | | | |
|---|---|---|---|
| 912,318 | 2/1909 | McMahon | 138—175 XR |
| 2,717,615 | 9/1955 | Peckworth | 138—175 |

SAMUEL ROTHBERG, *Primary Examiner.*

BRADFORD KILE, *Assistant Examiner.*